Jan. 25, 1949.  E. E. COMBS  2,459,794
SPHERICAL COIL FOR VARIOMETERS
Filed Sept. 12, 1945

INVENTOR.
EDWARD E. COMBS
BY
William N. Hall
Attorney.

Patented Jan. 25, 1949

2,459,794

UNITED STATES PATENT OFFICE 2,459,794

SPHERICAL COIL FOR VARIOMETERS

Edward E. Combs, Long Branch, N. J.

Application September 12, 1945, Serial No. 615,910

1 Claim. (Cl. 175—359)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to spherical coils used in radio tuning circuits. The invention discloses the structural features of the spherical coils, the method of winding such coils having been disclosed in a parent application, Serial number 552,859, filed September 6, 1944, now Patent number 2,441,564, titled "Spherical coils for variometer," this application being a continuation-in-part of the parent application.

It is very well known in the radio art that the spherical coils when used in connection with variometers are much more effective than the cylindrical coils because the spherical coil rotor may be coupled much closer to the cylindrical stator of the variometer thus enabling one to span much wider frequency band with the variometers of this type, the combination being capable of replacing as many as six fixed R. F. coils. Although the advantages of the spherical coils are well known in the art, their use has been somewhat limited because no simple manufacturing methods were available, and, as a consequence, the majority of variometers used cylindrical rotors.

The invention discloses structural features of the spherical radio coils which support the wire, the latter having been given a spherical form during the winding operation of the coil. The winding methods and jigs for the coils of this type are disclosed in the parent application, and this application discloses the structural features of the coils produced according to the previously disclosed winding methods.

It is therefore an object of this invention to provide spherical radio coils having improved structural and electrical features.

Figure 3:
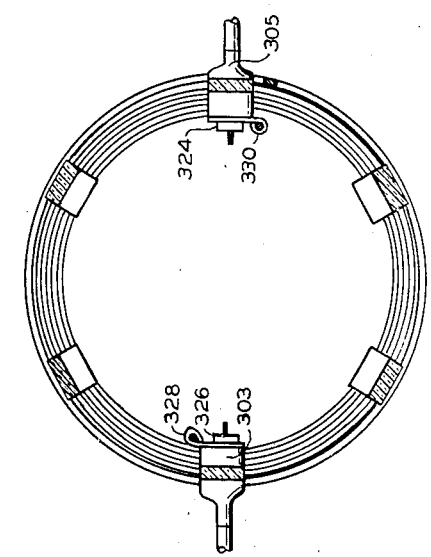
Figure 4:
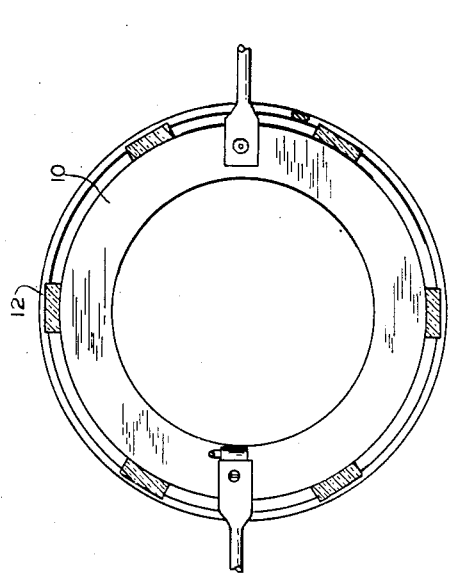
Figure 1:
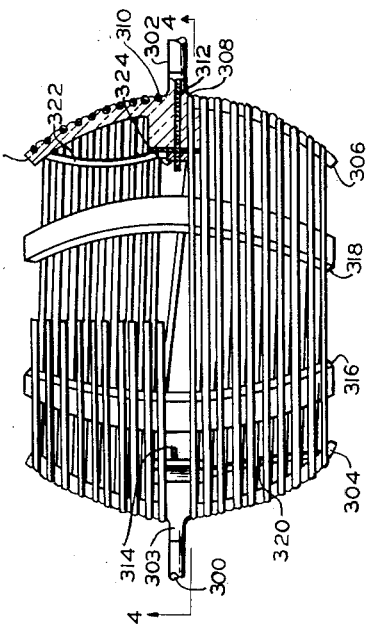
Figure 2:
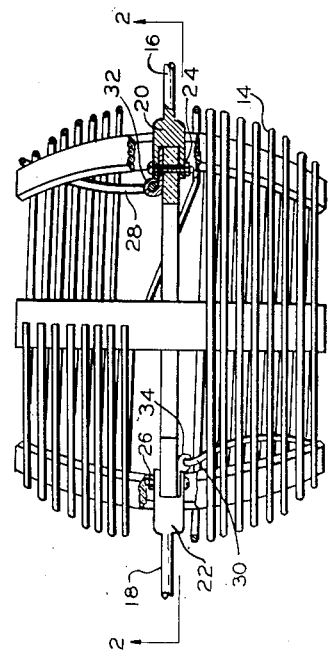

These and other features of the invention will be more clearly understood from the following detailed description and the accompanying drawings in which, Fig. 1 is a side view of a spherical coil, Fig. 2 is a cross-sectional view of Fig. 1 taken along the line 2—2, Fig. 3 is a side view of a spherical coil having a modified supporting structure, Fig. 4 is a cross-sectional view of Fig. 3 taken along line 4—4.

Referring to Figs. 1 and 2, the spherical coil includes a ring 10 preferably made of thermoplastic material having low loss factor. The ring is attached to ribs 12, the ribs being made preferably of the same material as ring 10, at the point of contact between the ribs and the ring by slightly heating the ribs or the ring or both which melts the thermoplastic material whereupon the ribs are placed against the ring and subsequent cooling of the melted thermoplastic material establishes the necessary bond between the ring and the ribs. The wire 14 is wound on the frame of the coil with the aid of a jig described in the parent application so that it represents a spherical surface. The wire is passed through a heater during the winding operation of the coil and before it comes into contact with the form. Since the temperature of the wire has been raised by the heater to a point sufficient for melting the thermoplastic material of the ribs, it imbeds itself in the ribs 12 upon coming into contact with them and rapid subsequent cooling of the wire and of the melted thermoplastic material establishes a very positive bond between the wound portion of the wire and the frame. The winding operation is continued until the entire form has been covered with the wire whereupon the wire is cut off from the wire spool, sufficient amount of wire being left for connecting the free ends of the wound wire to the shafts of the coil as illustrated in the figures. The wire is now held in place on the frame by the solidified thermoplastic material which partially overflows the wire at the points of its contact with the ribs. Ring 10 may be cemented to the ribs 12 either before the winding of the wire or after the completion of the winding operation. The ring, upon being cemented to the ribs, represents a centrally located rib-reinforcing member imparting rigidity to the entire coil and preventing cracking of ribs 12 in case of accidental dropping of the coil. The only other remaining operation to finish the coil resides in fastening metallic coil shaft pieces 16 and 18 with their bifurcated ends 20 and 22 to the ring, which is accomplished by means of bolts 24 and 26, and connecting the two ends 28 and 30 of the wire to the shafts by means of lugs 32 and 34.

Exceptionally rigid spherical coils are produced by the methods illustrated in Figs. 1 and 2, the coils having an additional advantage that only very limited amount of wire supporting insulation is used for obtaining the desired result. Accordingly coils of this type have small R. F. losses and high Q values.

Figs. 3 and 4 illustrate another coil form which differs from the one illustrated in Figs. 1 and 2 in that the central ring 10 has been eliminated and the two-piece shaft 300 and 302 is now connected directly to ribs 304 and 306 provided with bosses 303 and 305 for this purpose. The advantage of the coil illustrated in Figs. 3 and 4, as compared to the coil illustrated in Figs. 1 and 2 resides in the fact that a narrower spacing may be used between the central turns 308 and 310 of the coil since the shaft pieces 300 and 302 are now equipped with threaded pins 312 and 314 which do not require as much clearance between the turns as the bifurcated joints 20 and 22 in Fig. 1. The coil disclosed in Figs. 3 and 4 also represents a very rigid structure because the wire is held very securely in the ribs 304, 316, 318, 306, etc., of the coil because of the hot wire method of winding of the wire also used for obtaining the structure disclosed in Fig. 3. The connections between the end portions 320 and 322 of the wire and the shaft pieces is accomplished in a manner similar to that illustrated in Fig. 1, namely, the shafts are held securely in ribs 304 and 306 by means of nuts 324 and 326 and the wires are soldered to lugs 328 and 330 which are placed between the nuts and bosses 303 and 305 respectively.

While the invention has been described with reference to several particular embodiments, it will be understood that various modifications of the apparatus shown may be made within the scope of the following claim.

I claim:

A spherical wire-coil for variometer comprising a plurality of wire-supporting ribs made of thermoplastic material forming a spherical support for said coil, a coil-forming wire thermally imbedded in and supported by said ribs, thermoplastic re-enforcing means extending inwardly from opposed ribs and a two-piece metallic shaft having threaded reduced end portions passing through said re-enforcing means and connected thereto and to the ends of said coil.

EDWARD E. COMBS.

REFERENCES CITED

The following references are of record in the file of this patent:

UNITED STATES PATENTS

| Number | Name | Date |
|---|---|---|
| 1,422,429 | Filkins | July 11, 1922 |
| 1,546,424 | Wood | July 21, 1925 |
| 1,595,752 | Bohlman | Aug. 10, 1926 |
| 1,630,873 | Tuska | May 31, 1927 |
| 1,636,178 | Gargan | July 19, 1927 |
| 1,739,246 | Majce | Dec. 10, 1929 |

FOREIGN PATENTS

| Number | Country | Date |
|---|---|---|
| 220,185 | Great Britain | Aug. 14, 1924 |